US005614910A

United States Patent [19]
Bradley et al.

[11] Patent Number: 5,614,910
[45] Date of Patent: Mar. 25, 1997

[54] MISS DISTANCE VECTOR SCORING SYSTEM

[75] Inventors: Joseph L. Bradley, Oxnard; Don Whiteman; George T. Mills, both of Ridgecrest, all of Calif.

[73] Assignee: The United States of America as represented by the Secretary of the Navy, Washington, D.C.

[21] Appl. No.: 505,716

[22] Filed: Jul. 28, 1995

[51] Int. Cl.⁶ .................................................. G01S 13/48
[52] U.S. Cl. ............................................ 342/119; 342/103
[58] Field of Search .................................... 342/119, 146, 342/134, 195, 58, 59, 103; 364/423

[56] References Cited

U.S. PATENT DOCUMENTS

| | | | |
|---|---|---|---|
| 3,781,111 | 12/1973 | Fletcher et al. | 356/5 |
| 3,897,151 | 7/1975 | Lecroy | 356/5 |
| 4,057,708 | 11/1977 | Greeley et al. | 342/119 |
| 4,739,329 | 4/1988 | Ward et al. | 342/119 |
| 4,803,631 | 2/1989 | Newman | 342/119 |
| 5,181,039 | 1/1993 | Oswald et al. | 342/119 |

*Primary Examiner*—Daniel T. Pihulic
*Attorney, Agent, or Firm*—David S. Kalmbaugh; Melvin J. Sliwka

[57] ABSTRACT

A miss distance scoring system comprising four antennas which are configured to provide for an optimal radiation pattern of pulsed radio frequency energy to determine a missile's miss distance and miss direction from a target. Reflected pulses from a missile are received by each of the four antennas and then supplied by a radio frequency switch to a scalar scoring system which provides an analog video signal to four analog switches. The four analog switches are also connected to a controller which provides control signals to the switches to separately activate each switch. The activated analog switch then samples and holds the analog video signal with the sample being provided to an associated bandpass filter of the switch which is one of four bandpass filters. The sampled portions of the analog video signal are provided to a multiplexer and then passed sequentially through the multiplexer. The resulting doppler video signal is supplied to an analog to digital converter which converts this signal to an equivalent doppler digital signal. The equivalent doppler digital signal is next supplied to a pulse code modulation encoder which encodes the signal into a serial bit stream and provides a frame sync to the serial bit stream for transmission to a ground station by a transmitter and its associated antenna.

20 Claims, 8 Drawing Sheets

5,614,910

MISS DISTANCE VECTOR SCORING SYSTEM

BACKGROUND OF THE INVENTION

1. Field of the Invention

The present invention relates generally to the field of miss distance indicators. More specifically, the present invention relates to a digital and analog circuit which when used in conjunction with a miss distance scalar scoring system provides miss distance data to determine the miss distance and miss direction of a missile or the like fired at an airborne target.

2. Description of the Prior Art

Testing of advanced airborne weapons systems, such as missiles and the like, requires a scoring system which may be placed on a target drone to obtain miss distance data including vector, miss distance and miss direction, information.

In the past miss distance scoring devices utilized for airborne scoring of missile intercepts and misses of a target consisted of both cooperative type and non-cooperative type miss distance scoring devices. For example, the BIDOPS 800B, manufactured by the Babcock Company, is a non-cooperative acoustical device which utilizes a doppler shift to measure miss distance of the missile from the target. The AN/DRQ-3, AN/DRQ-3A and the AN/DRQ-4 are miss distance indicator systems which require an RF transmitter in the missile, an RF receiver and transmitter in the airborne target and a ground station to process data. The variety of missiles with which these systems may be used is limited because of the requirement to attach a transmitter to the missile being tested.

Other type miss distance indicators currently in use are either radioactive, static charge, magnetic or photographic in nature. These miss distance indicators are generally laboratory type systems which require special installation and handling precautions.

One particular prior art miss distance indicator is described in U.S. Pat. No. 3,897,151 to James F. Lecroy. Disclosed therein is a laser miss distance indicator which is an electro-optic device utilizing a light emitting diode and an electro-optic scanning system to radiate a hemispherically shaped pattern of electro-optical (light) energy about a target in which the device is installed. When a missile penetrates the radiation envelope, energy is reflected from the surface of the missile. The reflected energy is received by the miss distance indicator through the means of a detector. The detector converts the reflected light energy into an electrical signal which is amplified and processed to extract miss distance and vector information. The information is then transmitted to a ground receiving station where a computer processes the data to produce missile miss distance and flight trajectory information.

Inherent in these prior art miss distance indicator systems is the fact that their useful range is limited to about fifty feet and the fact that these systems are generally not accurate to less than ten feet. In addition, except for laboratory type devices, these prior art devices do not provide vector information which allows for a determination of the direction of the missile. It should also be noted that these prior art systems are often complex in design and very expensive.

A need therefore exist for a miss direction indicator which is relatively simple in design, inexpensive and highly reliable and which will provide vector, miss distance and miss direction information.

SUMMARY OF THE INVENTION

The present invention overcomes some of the disadvantages of the prior art including those mentioned above in that it comprises a relatively simple miss distance scoring system which indicates both miss distance and miss direction including, for example, the azimuth and elevation of a missile from a target. The miss distance scoring system comprises four antennas which are configured to provide for an optimal radiation pattern to determine a missile's miss distance and miss direction from the target. The antennas are omni-directional emitting a spherical radiation pattern of RF energy.

Reflected pulses from a missile are received by each of the four antennas and then supplied by an RF switch through a circulator to the input of a receiver of the AN/DSQ-37 scalar scoring system which provides an output level signal. This output level signal is an analog video signal which is indicative of the velocity of the missile under test.

A correlator within the AN/DSQ-37 scalar scoring system then provides the analog video signal to the input of each of four analog switches. The four analog switches are also connected to a controller which provides control signals to the switches to separately activate each switch. The activated analog switch then samples and holds the analog video signal with the sample being provided to an associated bandpass filter of the switch which is one of four bandpass filters.

The sampled portions of the analog video signal filtered by the filters are provided to a four to one multiplexer which is coupled to the controller. The filtered signals from the four filters are passed sequentially through the four to one multiplexer with the multiplexer control signal being supplied by the controller. The resulting doppler video signal is supplied to an analog to digital converter which converts this signal to an equivalent doppler digital signal. The equivalent doppler digital signal is next supplied to a pulse code modulation encoder which encodes the signal into a serial bit stream and provides a frame sync to the serial bit stream for transmission to a ground station by a transmitter and its associated antenna.

DETAILED DESCRIPTION OF THE PREFERRED EMBODIMENT

Figure 1:
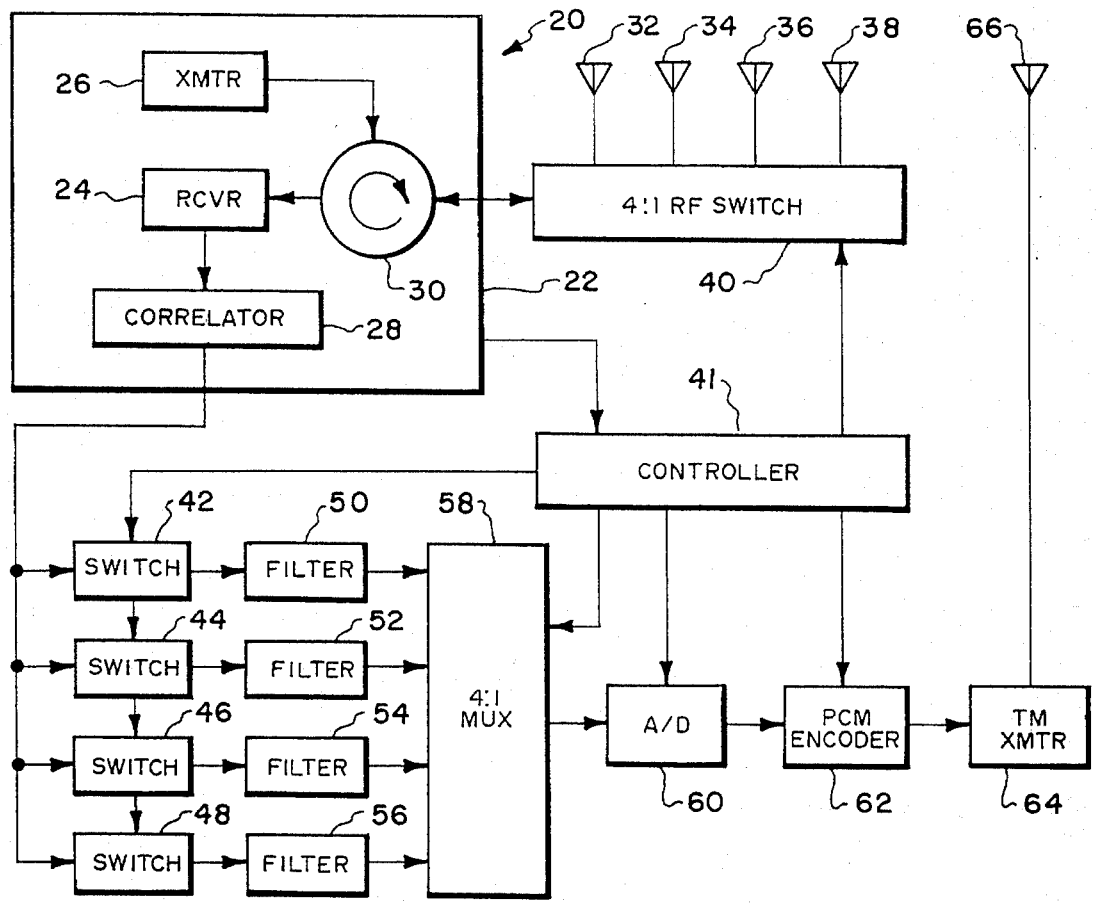
FIG. 1 is an electrical block diagram of an embodiment of the miss distance vector scoring system of the present invention.

Referring to FIG. 1, there is depicted an electrical schematic diagram of the miss distance vector scoring system 20 constituting the present invention. Miss distance vector scoring system 20 comprises an AN/DSQ-37 scalar scoring system 22 modified for use with vector scoring system 20 of FIG. 1.

The unmodified AN/DSQ-37 scalar scoring system 22 comprises an antenna (which represents the target and is not illustrated) which transmits radar pulses at a pulse repetition frequency (PRF) of 504 kHz. The pulses are reflected off of a missile or other device under test (not illustrated) and then received by scalar scoring system 22 with the receiver "ON" time, pulse width and transmitter and receiver duty cycle being set such that the received pulse from the missile is reflected in a range from about twenty five feet to about seventy five feet from the antenna of scoring system 22.

The receiver 24 of a scoring system 22 generates an output level which is based on the velocity of the missile or other device under test. The output of receiver 24 is bandpass filtered such that the doppler output corresponds to velocities of between 200 feet per second and 5000 feet per second. The miss distance from the AN/DSQ-37 scalar scoring system's antenna is then calculated at a ground station by counting the number of doppler cycles occurring within a calibrated 75 foot range gate.

To allow for a vector scoring system which provides miss direction and miss distance information, the AN/DSQ-37 is modified to allow for its use with four antennas 32, 34, 36 and 38. The antennas 32, 34, 36 and 38 may configured to provide for an optimal radiation pattern to determine a missile's miss distance and miss direction from a target.

For example, to test the operability and accuracy of the vector scoring system 20, antennas 32, 34, 36 and 38 were positioned in a generally square shaped pattern. Antenna 32 was positioned at a distance of 47 feet 10 inches from a moving device (a high speed sled) under test. Antenna 34 was positioned 12 feet from antenna 32 and 59 feet 10 inches from the moving device. Antenna 36 and 38 were positioned on opposite sides of and between antennas 36 and 34 with antennas 36 and 38 being about twelve feet apart.

It should be noted that each of the antennas 32, 34, 36 and 38 are omni-directional generating a spherical radiation pattern of RF energy. Each antenna 32, 34, 36 and 38, in turn, transmits an omni-directional beam of RF pulsed energy at a pulse repetition frequency of 126 kHz. It should also be noted that the AN/DSQ-37 scalar scoring system used in the present invention was manufactured by Motorola of Phoenix, Ariz.

The transmitter 26 within the AN/DSQ-37 scoring system 22 provides a radar pulse signal having a frequency of 504 kHz. This radar pulse signal passes through a circulator 30 to the input of a four to one RF switch 40. A controller 41 coupled to the AN/DSQ-37 scoring system 22 and switch 40 receives the 504 kHz frequency signal from the scoring system 22, processes the signal and generates switching control signals which are supplied to switch 40.

The RF switch 40, in response to these switching control signals, sequentially turns on each of the antennas 32, 34, 36 and 38, each of which operates at a pulse repetition frequency of 126 kHz. The antennas 32, 34, 36 and 38 are turned on by RF switch 40 such that each antenna 32, 34, 36 or 38 receives only reflections from its own transmitted pulses.

Reflected pulses from a missile or device under test are supplied by RF switch 40 as electrical signals through circulator 30 to the input of receiver 24. The receiver 24 of the AN/DSQ-37 scalar scoring system 22 provides an output level signal which is an analog video signal and which is indicative of the velocity of the missile or device under test with respect to the antennas 32, 34, 36 and 38 of scoring system 20.

The correlator 28 then provides this analog video signal to the input of each of four analog switches 42, 44, 46 and 48. Analog switches 42, 44, 46 and 48 are also connected to controller 41 which provides control signals to switches 42, 44, 46 and 48 to separately activate each switch 42, 44, 46 or 48. When, for example, the reflected pulses from antenna 32 are being processed by the AN/DSQ-37 scalar scoring system 22, controller 41 will activate analog switch 42 which then samples and holds the analog video signal from correlator 28. In a like manner, when the reflected pulses from antenna 34 are being processed by the AN/DSQ-37 scalar scoring system 22, controller 41 will activate analog switch 44 which then samples and holds the analog video signal from correlator 28. Controller 41 also activates analog switch 46 when the reflected pulses from antenna 36 are being processed by the AN/DSQ-37 scalar scoring system 22 and controller 41 activates analog switch 48 when the reflected pulses from antenna 38 are being processed by the AN/DSQ-37 scalar scoring system 22.

The sampled portion of the analog video signal stored by analog switch 42 is supplied to a filter 50; the sampled portion of the analog video signal stored by analog switch 44 is supplied to a filter 52; the sampled portion of the analog video signal stored by analog switch 46 is supplied to a filter 54 and the sampled portion of the analog video signal stored by analog switch 48 is supplied to a filter 56.

The signals filtered by filters 50, 52, 54 and 56 are respectively provided to the first, second, third and fourth inputs of a four to one multiplexer 58 which is coupled to controller 41. The filtered signals from filters 50, 52, 54 and 56 are passed sequentially through four to one multiplexer 58 with the multiplexer control signal being supplied by controller 41 to multiplexer 58. The resulting doppler video signal is supplied to an analog to digital converter 60 which converts this signal to an equivalent doppler digital signal. The equivalent doppler digital signal is next supplied to a pulse code modulation encoder 62 which encodes the signal into a serial bit stream for transmission to a ground station by a transmitter 64 and its associated antenna 66 and also provides a frame sync for the serial bit stream prior to transmission to the ground station.

The miss distance for each antenna 32, 34, 36 and 38 is again calculated by counting the number of doppler cycles which occur within the calibrated range of between 25 feet and 78 feet for miss distance vector scoring system 20. The miss distance data from antennas 32, 34, 36 and 38 is correlated at the ground station to translate scalar information from each antenna 32, 34, 36 and 38 to vector miss distance.

Figure 2A:
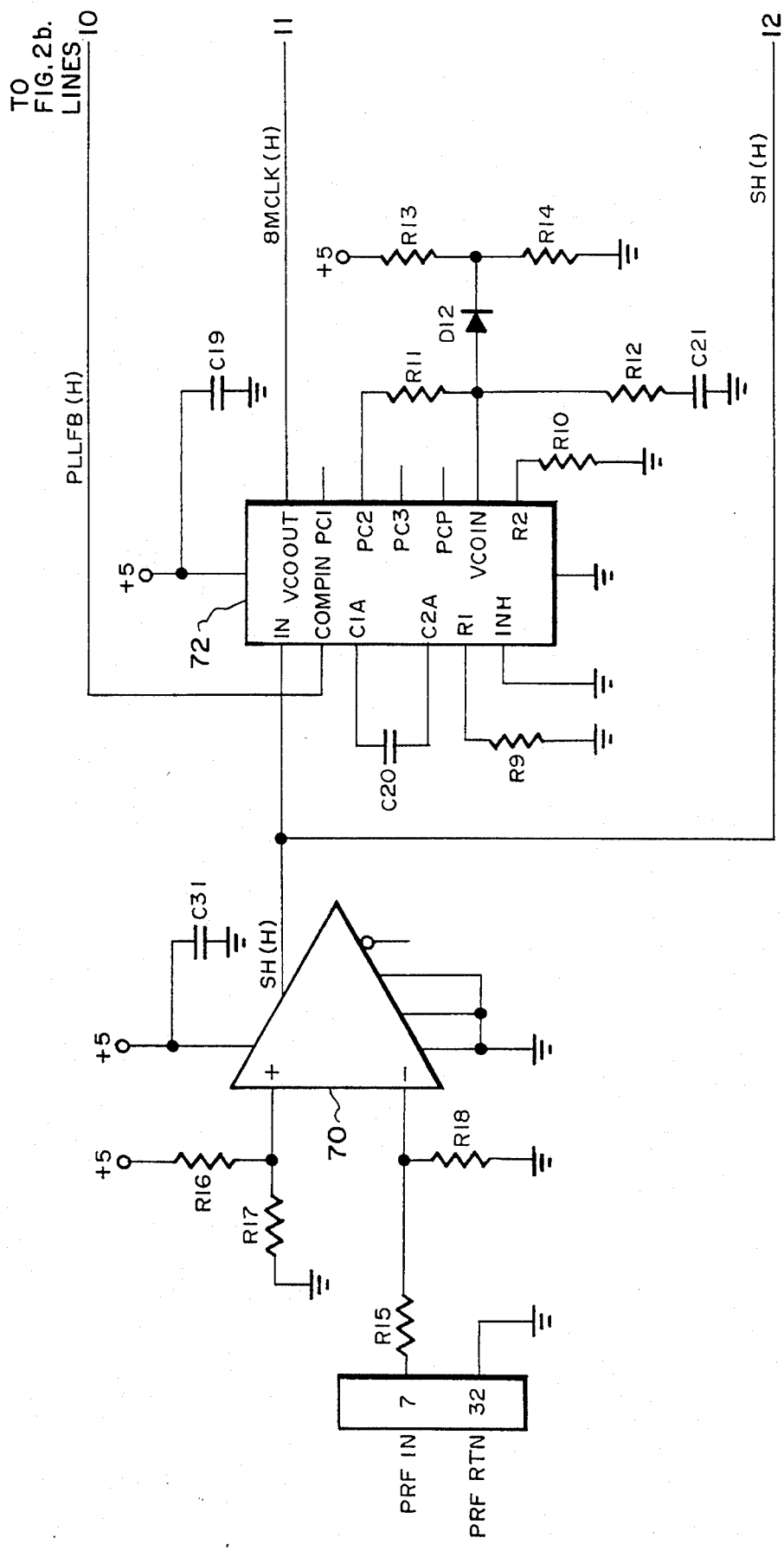
FIGS. 2a–2c is a detailed electrical schematic diagram of some of the components of the miss distance vector scoring system of FIG. 1.
Figure 2B:
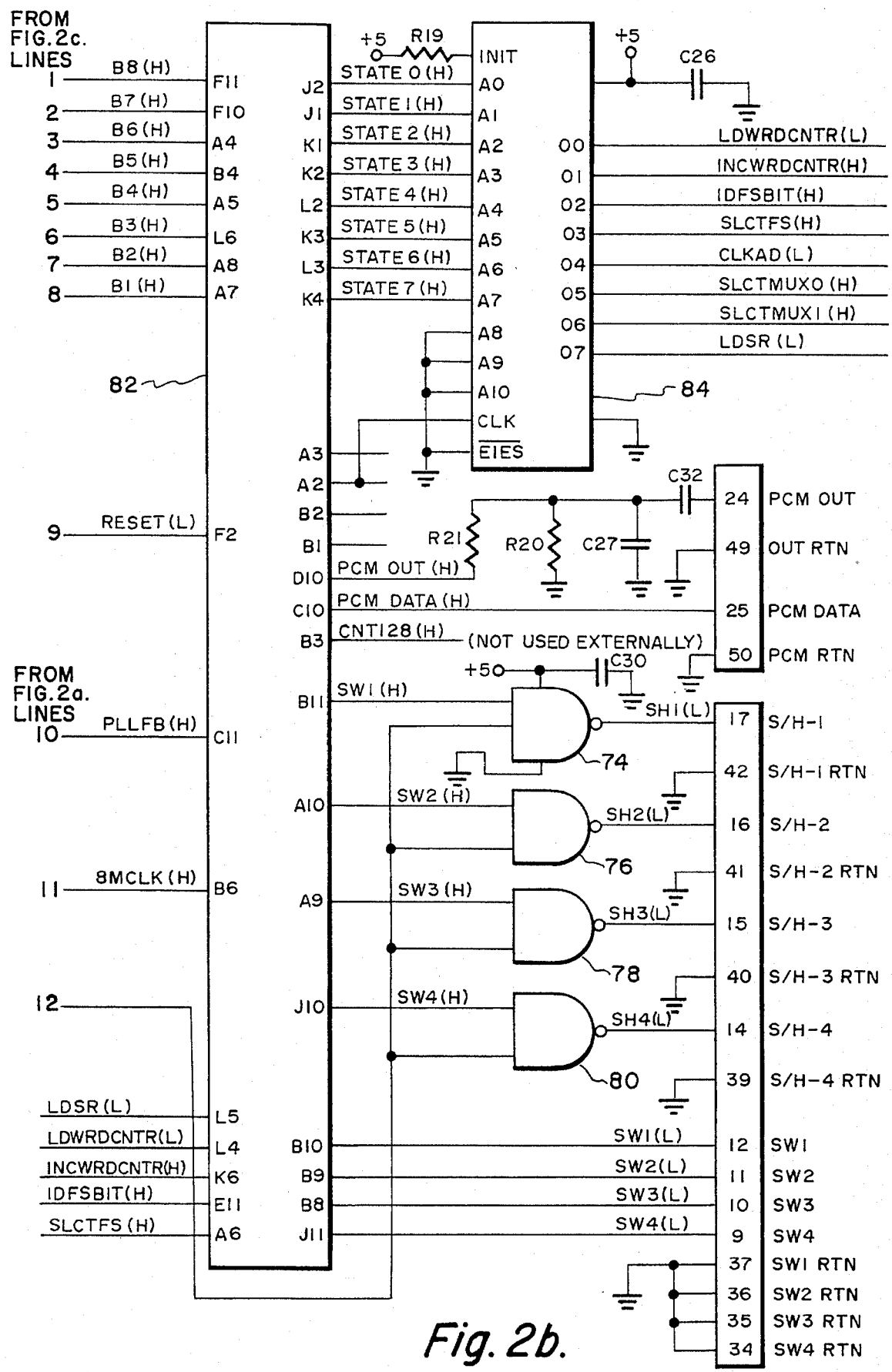

Referring to FIGS. 2a and 2b, a two volt to ten volt negative going pulse having a frequency of 504 kHz is supplied to the negative input of a comparator 70 by AN/DSQ-37 scalar scoring system 22. The pulse width of this negative going pulse is about fifteen nanoseconds. The comparator 70 inverts this pulse and limits the pulse to a voltage of from zero volts to five volts. The frequency of this zero to five volt digital pulse signal is also 504 kHz.

This digital pulse signal is then supplied to the signal input of phase lock loop circuit 72 and the first inputs of NAND gates 74, 76, 78 and 80. A programmed array logic device 82 provides synchronizing signals to the second inputs of NAND gates 74, 76, 78 and 80 with these synchronizing signals having a frequency that is one fourth the frequency of the 504 kHz digital pulse signal. This, in turn, results in a pulse signal having a pulse repetition frequency of 126 kHz occurring at each output of NAND gates 74, 76, 78 and 80. NAND gates 74, 76, 78 and 80 are, in turn, respectively connected to switches 42, 44, 46 and 48 (FIG. 1).

Phase lock loop circuit 72 provides at its VCOOUT output an 8.064 megahertz clock signal which is supplied to the B6 input of programmed array logic device 82. The programmed array logic device provides a phase lock loop feedback signal (PLLFB(H)) also having a frequency of 504 kHz to the COMPIN input of phase lock loop circuit 72.

Figure 3D:
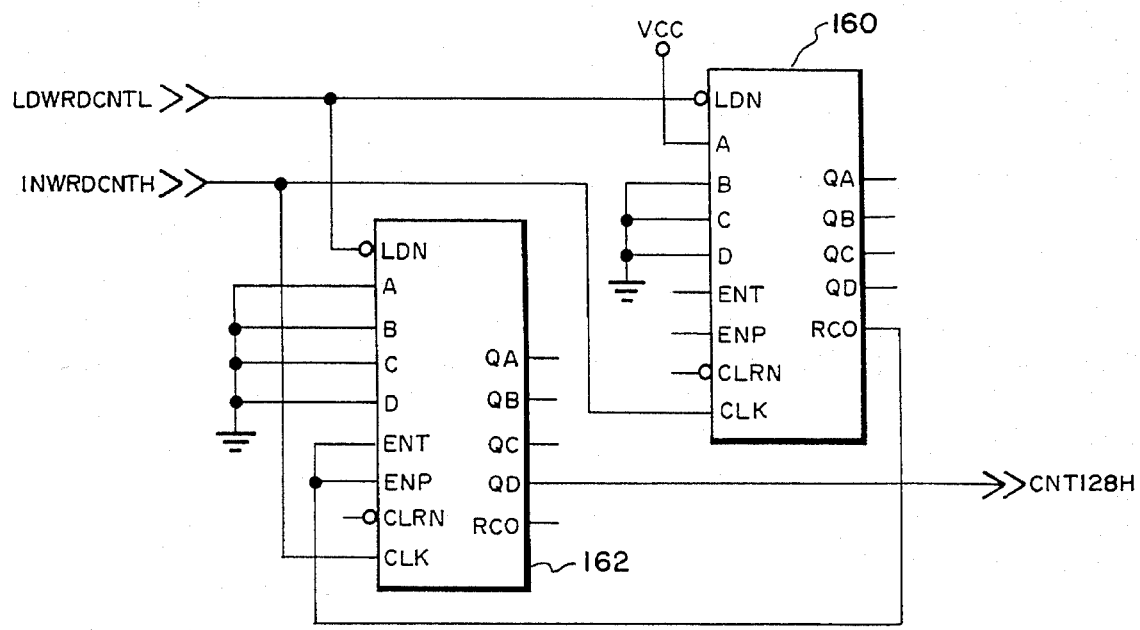
FIGS. 3a–3d is a detailed electrical schematic diagram of the programmed logic device of FIG. 2.
Figure 3A:
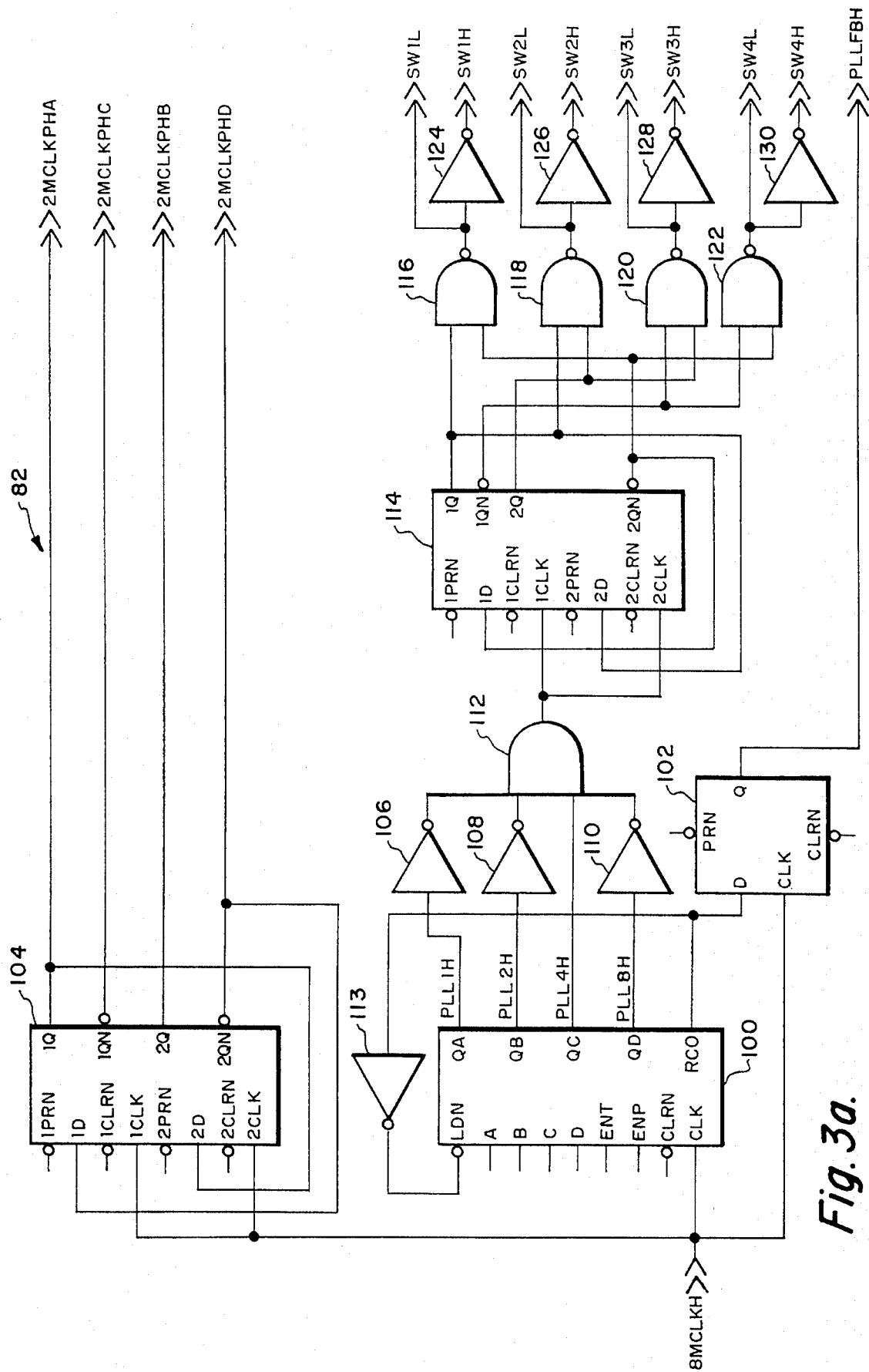

Referring to FIG. 3a, the 8.064 megahertz clock signal is supplied to a synchronous four bit binary counter 100, which provides at its carry output (RCO) a pulse having a frequency of about 504 kHz. This pulse is supplied to the D input of a Flip-Flop 102, clocked through Flip-Flop 102 to its Q output and then supplied to COMPIN input of phase lock loop circuit 72 (FIG. 2a) phase locking the 504 kHz digital pulse signal from scalar scoring system 22 to the phase lock loop feedback signal from programmed array logic device 82. Flip-Flop 102 eliminates noise from the signal occurring at the carry output of counter 100.

At this time it should be noted that the phase lock loop circuit used in the preferred embodiment is a Model HC4046A CMOS Phase Lock Loop manufactured by Harris Corporation of Melbourne, Fla. It should be understood, however, that any commercially available phase lock loop such as a Model MM74HC4046 phase lock loop with microcircuit modifications manufactured by National Semiconductor may be used as phase lock loop circuit 72.

It should also be noted that the programmed array logic device 82 used the preferred embodiment is a Model EPM-5128 Erasable Programmable Logic Device (EPLD) commercially available from the Altera Corporation of San Jose, Calif. The EPM-5128 Erasable Programmable Logic Device is a Programmable Logic Device which is a digital, user-configurable integrated circuit used to implement custom logic circuits of the type illustrated in FIG. 3.

Figure 3B:
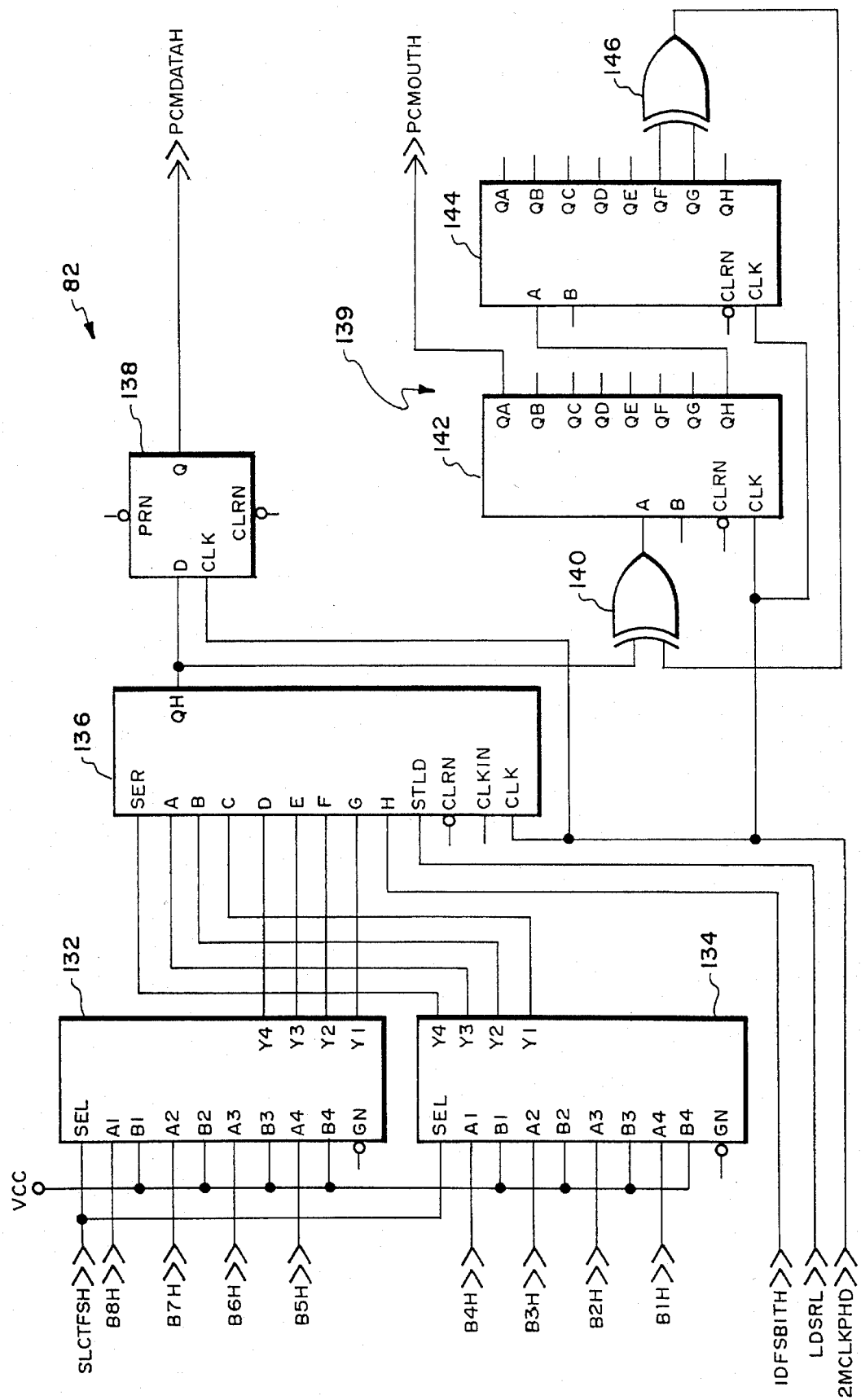

Referring to FIGS. 1, 3a and 3b, the 8.064 megahertz clock signal is also supplied to the CLK1 and CLK2 inputs of a Dual D-Type Flip-Flop 104 which then provides a Phase A, a Phase B, a Phase C and a Phase D clock signal each of which has a frequency of two megahertz.

Counter 100 provides at its QA output a square wave signal (PLL1H) having a frequency of about four megahertz, at its QB output a square wave signal (PLL2H) having a frequency of about two megahertz, at its QC output a square wave signal (PLL4H) having a frequency of about one megahertz and at its QD output a square wave (PLL8H) signal having a frequency of 504 kHz. The PLL1H, PLL2H and PLL8H signals are respectively inverted by inverters 106, 108 and 110 with the inverted PLL1H, PLL2H and PLL8H signals being provided to the first, second and fourth inputs of an AND gate 112. When the count reaches four, that is four clock pulses of the 8.064 megahertz clock signal have been supplied to the clock input of counter 100 a pulse occurs at the output of AND gate 112. The frequency of this pulse signal is again 504 kHz and the pulse width is about 12.5 microseconds. The 504 kHz pulse signal occurring at the output of AND gate 112 is supplied to the 1CLK and 2CLK inputs of a Dual D-Type Flip-Flop 114. The Dual D-Type Flip-Flop 114 divides this signal resulting in a pulsed signal occurring at the 1Q and 2Q outputs of Flip-Flop 114 which has a frequency of 126 kHz. The 1QN and 2QN outputs of Flip-Flop 114 provide an inverted 126 kHz pulse signal. The combination logic of NAND gates 116, 118, 120 and 122; inverters 124, 126, 128 and 130 and Dual D-Type Flip-Flop 114 provide the four phase 126 kHz signals required to enable NAND gates 74, 76, 78 and 80 (FIG. 2B).

For example, when the 1Q output and the 2QN output of Flip-Flop 114 are each at the logic one state, a logic zero is provided at the output of NAND gate 116 which results in a logic one at the output of inverter 124 which is supplied to NAND gate 74 enabling NAND gate 74. In a like manner, when the 1Q output and the 2Q output of Flip-Flop 114 are each at the logic one state, a logic zero is provided at the output of NAND gate 118 which results in a logic one at the output of inverter 126 which is supplied to NAND gate 76 enabling NAND gate 76. When the 1QN output and the 2Q output of Flip-Flop 114 are each at the logic one state, a logic zero is provided at the output of NAND gate 120 which results in a logic one at the output of inverter 128 which is supplied to NAND gate 78 enabling NAND gate 78. Further, when the 1QN output and the 2QN output of Flip-Flop 114 are each at the logic one state, a logic zero is provided at the output of NAND gate 122 which results in a logic one at the output of inverter 130 which is supplied to NAND gate 80 enabling NAND gate 80.

Referring to FIGS. 1, 2a and 2b, when NAND gate 74 is enabled the 504 kHz digital pulse signal from comparator 70 is inverted by and passes through NAND gate 74 resulting in a negative going sample-hold pulse signal (SH1(L)) having a frequency of 126 kHz. The SH1(L) sample-hold pulse signal is then supplied to analog switch 42.

When NAND gate 76 is enabled the 504 kHz digital pulse signal from comparator 70 is inverted by and passes through NAND gate 76 resulting in a negative going sample-hold pulse signal (SH2(L)) having a frequency of 126 kHz. The SH2(L) sample-hold pulse signal is then supplied to analog switch 44.

When NAND gate 78 is enabled the 504 kHz digital pulse signal from comparator 70 is inverted by and passes through NAND gate 78 resulting in a negative going sample-hold pulse signal (SH3(L)) having a frequency of 126 kHz. The SH3(L) sample-hold pulse signal is then supplied to analog switch 46.

When NAND gate 80 is enabled the 504 kHz digital pulse signal from comparator 70 is inverted by and passes through NAND gate 80 resulting in a negative going sample-hold pulse signal (SH4(L)) having a frequency of 126 kHz. The SH4(L) sample-hold pulse signal is then supplied to analog switch 48. Each of the sample-hold pulse signals SH1(L), SH2(L), SH3(L) and SH4(L) has a pulse width of about fifteen nanoseconds.

The SW1(L), SW2(L), SW3(L) and SW4(L) pulse signals occurring respectively at the outputs of NAND gates 116, 118, 120 and 122 (FIG. 3a) are provided to four to one RF switch 40, to turn on antennas 32, 34, 36 and 38. Each of these SW1(L), SW2(L), SW3(L) and SW4(L) pulse signals has a duty cycle of about 25 percent and a PRF of 126 kHz Referring to FIGS. 1, 2B and 2C, the reflected signals from antennas 32, 34, 36 and 38 are supplied through system 22, switches 42, 44, 46 and 48, filters 50, 52, 54 and 56 to the A0, A1, A2 and A3 inputs of Dual 4-Channel Analog Multiplexer 58. There is also supplied to the S0 and S1 of multiplexer 58 from a Programmed Read Only Memory (PROM) 84 a pair of multiplexer signals SLCTMUX0 and SLCTMUX1 which allow the reflected signals at the A0, A1, A2 and A3 inputs to pass through multiplexer 58 to its A output ($A_{OUT}$).

When, for example, logic zeros are supplied to the S0 and S1 inputs of multiplexer 58 the reflected signal at the A0 input of multiplexer 58 will pass through multiplexer 58 to the input of a current buffer 88. When logic ones are supplied to the S0 and S1 inputs of multiplexer 58 the reflected signal at the A3 input of multiplexer 58 will pass through multiplexer 58 to the input of current buffer 88. When a logic zero is supplied to the SO input and a logic one is supplied to the S1 input of multiplexer 58, the reflected signal at the A2 input of multiplexer 58 will pass through multiplexer 58 to the input of current buffer 88. When a logic one is supplied to the S0 input and a logic zero is supplied to the S1 input of multiplexer 58, the reflected signal at the A1 input of multiplexer 58 will pass through multiplexer 58 to the input of current buffer 88.

Buffer 88 functions as a current driver for analog-to-digital converter 60. Analog-to-digital 60 receives the reflected signal passing through multiplexer 58 and then converts the signal to an eight bit digital equivalent signal having a parallel format. The clock signal for analog-to-digital 60 is provided by Programmed Read Only Memory 84 and has a frequency of 504 kHz with two clock pulses being required for each sample converted to a digital format.

At this time, it should be noted that the multiplexer 58 used in the preferred embodiment is a Model HCT 4052 Dual 4-Channel Analog Multiplexer manufactured by Harris Corporation. It should be understood, however, that there are commercially available several multiplexer which function as multiplexer 58 such as a National Semiconductor Model MM74HC4052. It should also be noted that the analog-to-digital converter 60 used in the preferred embodiment of the present invention is a Model MP7684 commercially available from Micro Power Systems of Santa Clara, Calif. and the Programmed Read Only Memory 84 is a Model CY7C245 Reprogrammable 2048×8 Registered PROM commercially available from Cyprees Semiconductor of San Jose, Calif.

Referring to FIGS. 2b and 3d, Programmed Read Only Memory 84 supplies to the LDN inputs of a synchronous 4-bit binary counter 160 and a synchronous 4-bit binary counter 162 a load word counter pulse (LDWRCNTL) which loads into counters 160 and 162 a binary value of one. Programmed Read Only Memory 84 supplies to the CLK inputs of counters 160 and 162 an increment word counter (INWRDCNTH) signal which increments counters 160 and 162. Each time the reflected signals from antennas 32, 34, 36 and 38 are processed by miss distance vector scoring system 20 an increment word counter pulse is supplied to counters 160 and 162. When the counters 160 and 162 reach a count of 128, a count 128 pulse is generated at the QD output of counter 162.

Figure 3C:
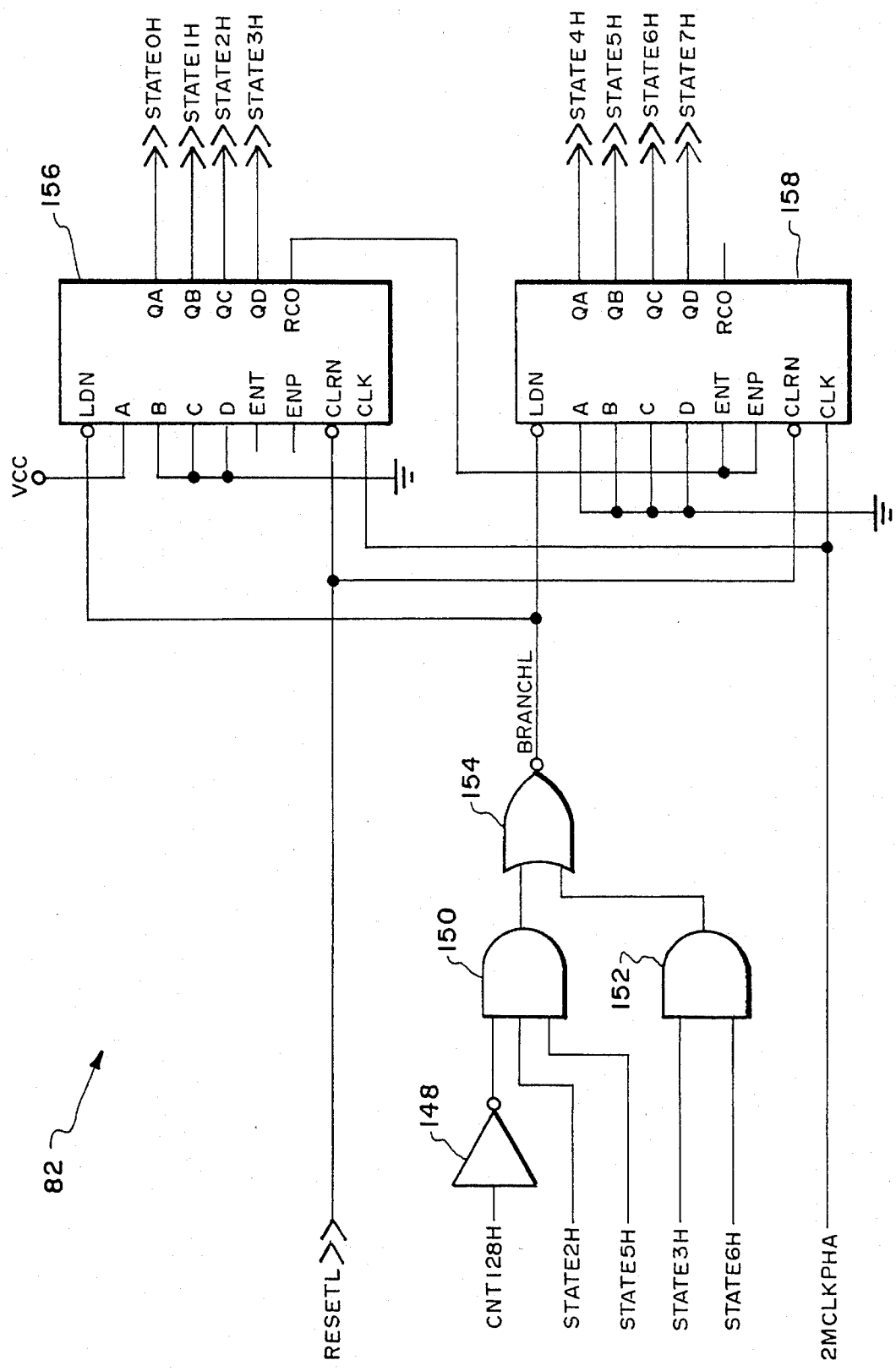

At this time it should be noted that Appendix A represents the eight bit control words stored in Programmed Read Only Memory 84 for each state address provided by a pair of synchronous 4-bit binary counters 156 and 158 (FIG. 3c). As is best shown in Appendix A, the load word counter pulse occurs at state address 46 hexadecimal, while the increment word counter pulses occur at state addresses 21 hexadecimal and 45 hexadecimal.

Referring to FIGS. 3a, 3c and 3d, a logic zero BRANCHL pulse provided to the LDN inputs of counters 156 and 158 load a count of one into counters 156 and 158. This logic zero BRANCHL pulse is generated whenever the output of NOR gate 154 transitions from the logic one state to the logic zero state.

A logic zero BRANCHL pulse occurs when the QD output of counter 162 is a logic zero (indicating a count of 128 has not been reached). This logic zero is inverted by inverter 148 to a logic one which is provided to the first input of AND gate 150. The QC output of counter 156 and the QB output of counter 158 are also at the logic one state resulting in a logic one at the output of AND gate 150, which is supplied to NOR gate 154. NOR gate 154 then transitions from the logic one state to the logic zero state.

A logic zero BRANCHL pulse will also occur when the QD output of counter 156 and the QC output of counter 158 are at the logic one state. Thus, this BRANCHL pulse occurs at state address 24 hexadecimal of Appendix A when the count provided by counters 160 and 162 is not 128 and also at state address 48 hexadecimal of Appendix A. The clock signal for counters 160 and 162 is a 2.016 megahertz clock signal (2MCLKPHA) supplied by Dual D-Type Flip-Flop 104 to the CLK inputs of counter 160 and 162.

Figure 2C:
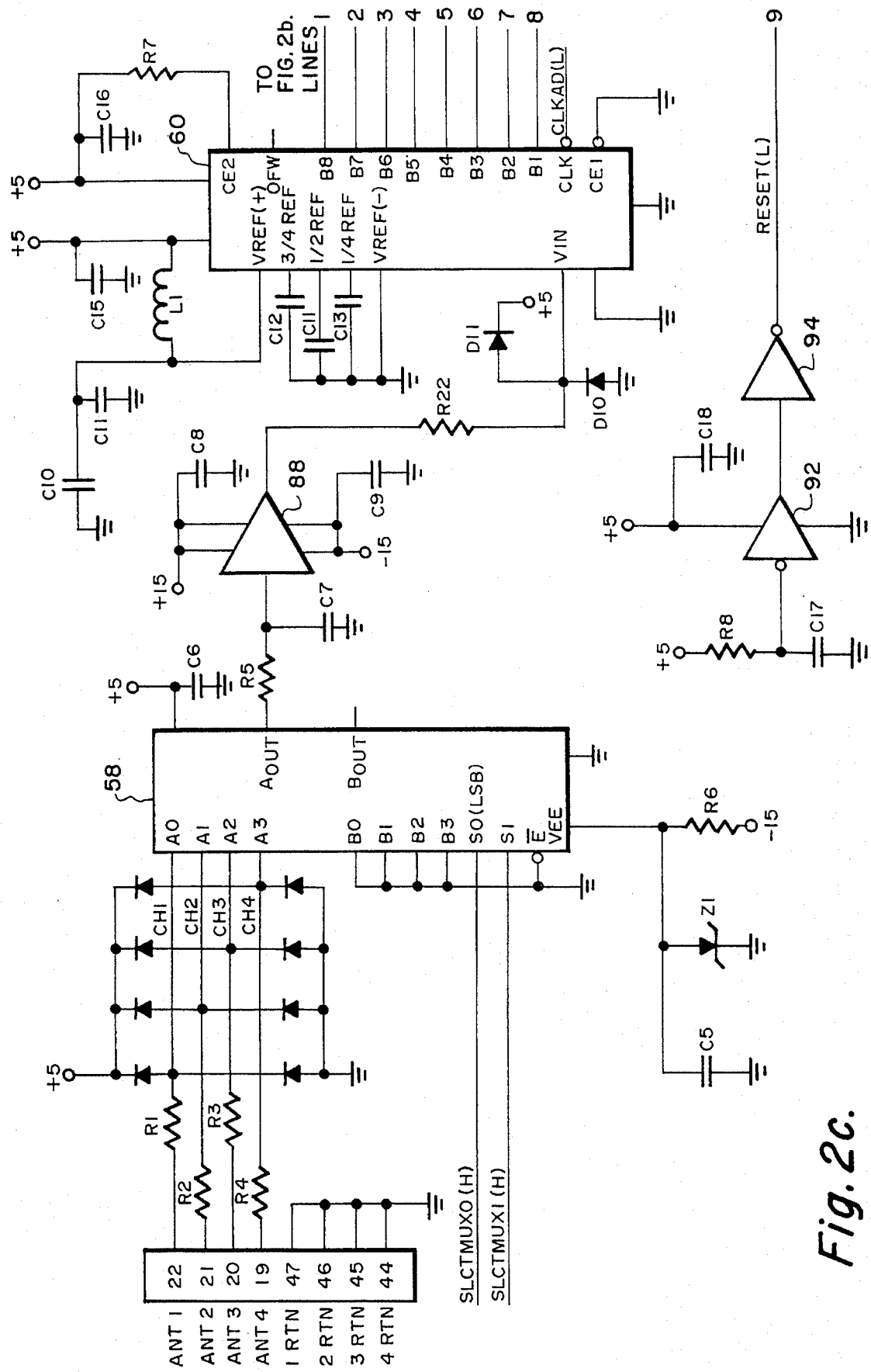

Referring to FIGS. 2b and 2c, it should be noted that the RESET signal line to programmed array logic device 82 includes a pair of series connected HEX SCHMITT inverters 92 and 94 and an RC network consisting of an 10 K-ohm resistor R8 and a 0.1 µF capacitor C17. When power is first turned on a logic zero is supplied to the F2 input of programmed array logic device 82 resetting programmed array logic device 82 followed by a logic zero to logic one transition at the output of inverter 94.

Referring to FIGS. 2b, 2c and 3b, Programmed Read Only Memory (PROM) 84 provides a SLCTFSH (select frame sync) signal to a pair of 2-line to 1-line multiplexers 132 and 134. At address states 25–26 (hexadecimal) and address states 2E–2F (hexadecimal) a logic one select frame sync signal is supplied to the SEL inputs of multiplexers 132 and 134. This logic one select frame sync signal selects the B1, B2, B3 and B4 inputs of multiplexers 132 and 134 allowing the logic ones at the B1, B2, B3 and B4 inputs of multiplexers 132 and 134 to pass through multiplexers 132 and 134 to their Y1, Y2, Y3 and Y4 outputs.

During state addresses 25 through 36 the frame sync is generated. The frame sync comprises two nine bit words with the first bit of each word being the identification bit and the eight remaining bits being data bits. At state addresses 25 and 26 (Appendix A) the frame sync identification bit IDFSBIT(H) is zero resulting in Programmed Read Only Memory (PROM) 84 supplying a logic zero to the H input of a parallel to serial shift register 136. Logic ones from multiplexers 132 and 134 are provided to the SER, A, B, C, D, E, F and G inputs of parallel to serial shift register 136. Parallel to serial shift register 136 then supplies the first word of the frame sync, which is 0,1,1,1,1,1,1,1,1, to the D input of a Flip-Flip 138 and a randomizer 139 comprising a pair of EXCLUSIVE-OR gates 140 and 146 and a pair of serial to parallel shift registers 142 and 144.

In a like manner, at state addresses 2E and 2F the frame sync identification bit IDFSBIT(H) is one resulting in Programmed Read Only Memory (PROM) 84 supplying a logic zero to the H input of parallel to serial shift register 136. Logic ones from multiplexers 132 and 134 are provided to the SER, A, B, C, D, E, F and G inputs of parallel to serial shift register 136. Parallel to serial shift register 136 then supplies the second word of the frame sync, which is 1,1,1,1,1,1,1,1,1, to the D input of Flip-Flip 138 and randomizer 139. The frame sync signal provided to randomizer 139 has eighteen bits output from the QH output of Parallel to serial shift register 136 as follows: 0,1,1,1,1,1,1,1,1,1,1, 1,1,1,1,1,1,1.

It should be noted that the generation of a frame sync results in two nine bit words of data not being transmitted to a ground station by the miss distance vector scoring system 20.

A 2.016 megahertz clock signal (2MCLKPHD) from Dual D-Type Flip-Flop 104 is supplied to the clock input of Flip-Flop 138 clocking the first word of the frame sync through Flip-Flop 138 to the PCMDATA(H) output of programmed array logic device 82. The PCMDATA(H)

output is a test point allowing the user of the miss distance vector scoring system 20 to test the nine bit words including data words being supplied to randomizer 139. Flip-Flop 138 eliminates noise from the data appearing at the PCMDATA(H) output of programmed array logic device 82.

Randomizer 139 is implemented in accordance with a RNRZ-L (randomized non-return to zero level) code which is a pseudo-random sequence. Randomizer 139 includes a network of shift registers 142 and 144 and module-2 adders (EXCLUSIVE-OR gates 140 and 146). The following Boolean Expression defines the Data Output (PCMOUTH) of Randomizer 139.

$$D = A \oplus B \oplus C \qquad (1)$$

where A is the data from register 136 which is supplied to the first input of EXCLUSIVE-OR gate 140, B is the fourteenth bit from a fifteen stage shift register (registers 142 and 144 form the fifteen stage shift register), C is the fifteenth bit from the fifteen stage shift register and D is the QA output of shift register 142. The clock signal for randomizer 139 is the 2.016 megahertz clock signal 2MCLKPHD which is provided by Dual D-Type Flip-Flop 104. The RNRZ-L data stream from the output of EXCLUSIVE-OR gate 140 is clocked through register 142 to its QA output to eliminate noise from the data stream. Randomizing the data provided by miss distance vector scoring system 20 eliminates long strings of ones and zeros from the data transmitted by transmitter 64 to a ground station.

At this time it should be noted that 2-line to 1-line multiplexers 132 and 134; parallel to serial shift register 136 and randomizer 139 of programmed array logic device 82 function as encoder 62 which encodes the equivalent digital signal from analog-to-digital converter 60 into a serial bit stream and also providing a frame sync for the serial bit stream prior to transmission to a ground station.

The RNRZ-L data stream from the QA output of register 142 is supplied to transmitter 64 for transmission to a ground station by transmitter 64 and its associated antenna 66.

Figure 4:
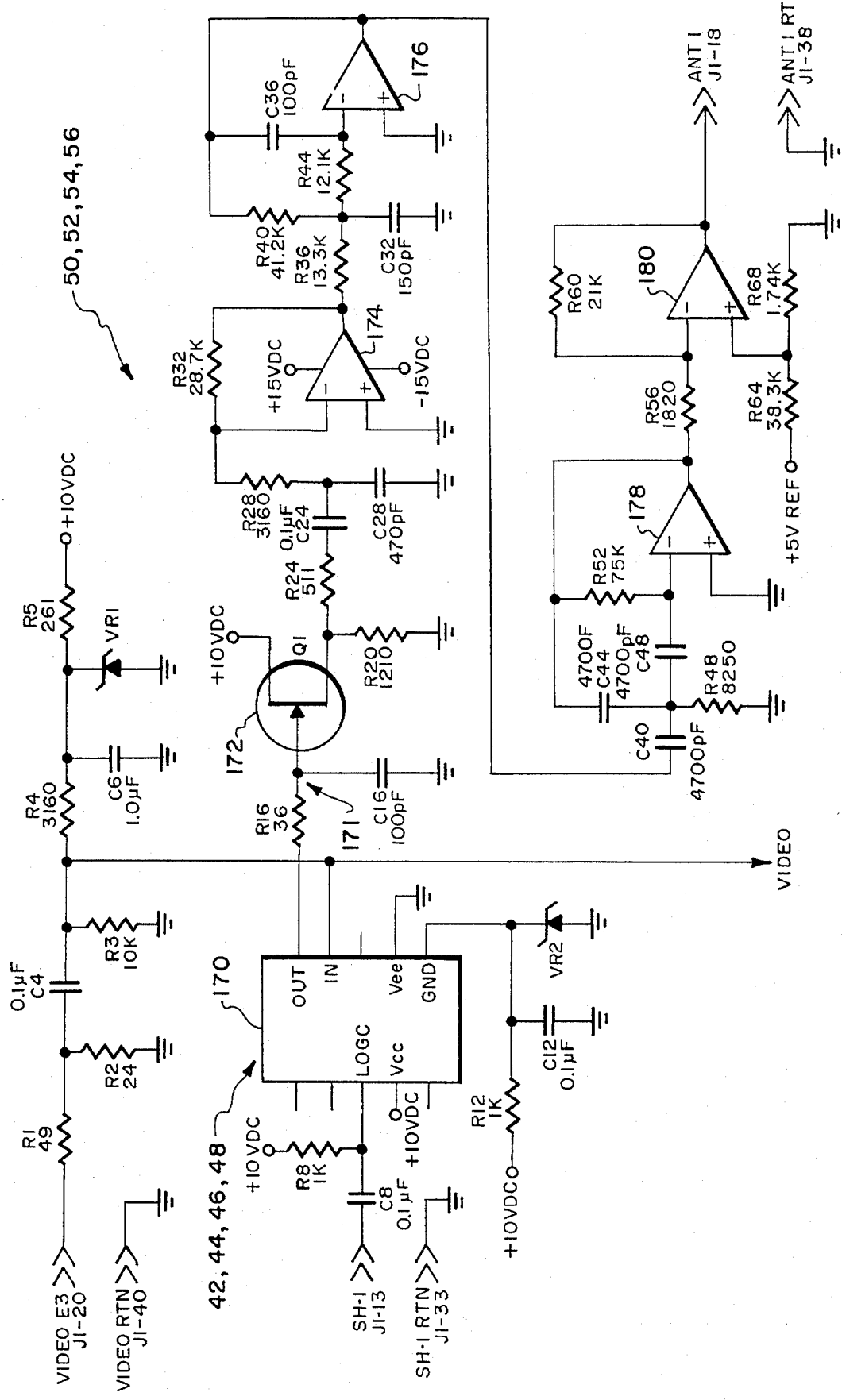
FIG. 4 is a detailed electrical schematic diagram of each of the filters of FIG. 1.

Referring to FIGS. 1 and 4, there is shown only a detailed electrical schematic diagram of one switch 42, 44, 46 and 48 and its associated filter 50, 52, 54 and 56. Since each switch and its associated filter are identical, the following discussion will be with respect to the operation of a switch 42 and its associated filter 50.

Received pulses from a missile in a range from about twenty five feet to about seventy five feet from antenna 32 are range gated by receiver 24. The received analog video signal from correlator 28 of AN/DSQ-37 scalar scoring system 22 is provided to a VIDEO E3 input of a connector J1, while the SH1(L) sample-hold pulse signal from programmed array logic device 82 is supplied to the LOGC input of analog switch 170 (which is analog switch 42 in FIG. 1). The sample-hold pulse signal SH1(L) turns on switch 170 allowing analog data from antenna 32 to pass through the switch 170 to the resistor R16 and capacitor C16 which form sample/hold circuit 171. Sample/hold circuit 171 captures the analog data for processing by filter 50. The amplitude of the output of receiver 24 is sampled by sample/hold circuit 171. Switch 170 is turned on for a short time period of about fifteen nanoseconds.

The analog data sample held by sample/hold circuit 171 is supplied to a field effect transistor 172, which functions as a current driver. The analog data sample is next supplied to a seven pole filter circuit comprising operational amplifiers 174, 176, 178 and 180. In a doppler radar system velocity is dependent upon the frequency of the return signal. The filter circuit operates in a range of about seven hundred hertz to eighteen kilohertz which corresponds to a velocity of two hundred feet per second to five thousand feet per second.

Capacitors C24 and C28 and resistor R24 function as a two pole bandpass filter, amplifier 178 is a gain stage which amplifies the signal by a factor of about nine, amplifier 176 functions as a two pole low pass filter and amplifier 178 also functions as a three pole high pass filter. The combination of amplifiers 174, 176 and 178 provide the band pass of between about seven hundred hertz to eighteen kilohertz. Operational amplifier 180 functions as a level shifter shifting the filtered analog data sample to a voltage range of between zero and five volts. This voltage range allows analog to digital converter 60 to convert the filtered analog data sample to an equivalent digital signal.

It should be noted that this seven pole bandpass filter results in the loss of a DC offset necessitating the use of the level shifting amplifier 180.

From the foregoing, it may be readily be seen that the subject invention comprises a new, unique and exceedingly useful miss distance scoring system which allows the user to determine miss distance and miss direction of a missile from a target and which constitutes a considerable improvement over the known prior art. Obviously many modifications and variations of the present invention are possible in light in light of the above teachings. It is therefore to be understood that within the scope of the appended claims, the invention may be practiced otherwise than as specifically described.

APPENDIX A

| STATE | OUTPUTS | | | | | | | |
|---|---|---|---|---|---|---|---|---|
| | LDSR | SLCTMUX1 | SLCTMUX0 | CLKAD | SLCTFS | IDFSBIT | INCWRDCNTR | LDWRDCNTR |
| 00 | 1 | 1 | 1 | 0 | 0 | 0 | 0 | 0 |
| 01 | 0 | 1 | 1 | 0 | 0 | 0 | 0 | 1 |
| 02 | 1 | 1 | 1 | 0 | 0 | 0 | 0 | 1 |
| 03 | 1 | 1 | 1 | 0 | 0 | 0 | 0 | 1 |
| 04 | 1 | 1 | 1 | 0 | 0 | 0 | 0 | 1 |
| 05 | 1 | 1 | 1 | 0 | 0 | 0 | 0 | 1 |
| 06 | 1 | 1 | 1 | 0 | 0 | 0 | 0 | 1 |
| 07 | 1 | 1 | 1 | 1 | 0 | 0 | 0 | 1 |
| 08 | 1 | 1 | 1 | 0 | 0 | 0 | 0 | 1 |
| 09 | 1 | 1 | 1 | 1 | 0 | 0 | 0 | 1 |
| 0A | 0 | 0 | 0 | 0 | 0 | 0 | 0 | 1 |
| 0B | 1 | 0 | 0 | 0 | 0 | 0 | 0 | 1 |
| 0C | 1 | 0 | 0 | 0 | 0 | 0 | 0 | 1 |

APPENDIX A-continued

| | | | | OUTPUTS | | | | |
|---|---|---|---|---|---|---|---|---|
| STATE | LDSR | SLCTMUX1 | SLCTMUX0 | CLKAD | SLCTFS | IDFSBIT | INCWRDCNTR | LDWRDCNTR |
| 0D | 1 | 0 | 0 | 0 | 0 | 0 | 0 | 1 |
| 0E | 1 | 0 | 0 | 0 | 0 | 0 | 0 | 1 |
| 0F | 1 | 0 | 0 | 0 | 0 | 0 | 0 | 1 |
| 10 | 1 | 0 | 0 | 1 | 0 | 0 | 0 | 1 |
| 11 | 1 | 0 | 0 | 0 | 0 | 0 | 0 | 1 |
| 12 | 1 | 0 | 0 | 1 | 0 | 0 | 0 | 1 |
| 13 | 0 | 0 | 1 | 0 | 0 | 0 | 0 | 1 |
| 14 | 1 | 0 | 1 | 0 | 0 | 0 | 0 | 1 |
| 15 | 1 | 0 | 1 | 0 | 0 | 0 | 0 | 1 |
| 16 | 1 | 0 | 1 | 0 | 0 | 0 | 0 | 1 |
| 17 | 1 | 0 | 1 | 0 | 0 | 0 | 0 | 1 |
| 18 | 1 | 0 | 1 | 0 | 0 | 0 | 0 | 1 |
| 19 | 1 | 0 | 1 | 1 | 0 | 0 | 0 | 1 |
| 1A | 1 | 0 | 1 | 0 | 0 | 0 | 0 | 1 |
| 1B | 1 | 0 | 1 | 1 | 0 | 0 | 0 | 1 |
| 1C | 0 | 1 | 0 | 0 | 0 | 0 | 0 | 1 |
| 1D | 1 | 1 | 0 | 0 | 0 | 0 | 0 | 1 |
| 1E | 1 | 1 | 0 | 0 | 0 | 0 | 0 | 1 |
| 1F | 1 | 1 | 0 | 0 | 0 | 0 | 0 | 1 |
| 20 | 1 | 1 | 0 | 0 | 0 | 0 | 0 | 1 |
| 21 | 1 | 1 | 0 | 0 | 0 | 0 | 1 | 1 |
| 22 | 1 | 1 | 0 | 1 | 0 | 0 | 0 | 1 |
| 23 | 1 | 1 | 0 | 0 | 0 | 0 | 0 | 1 |
| 24 | 1 | 1 | 0 | 1 | 0 | 0 | 0 | 1 |
| 25 | 0 | 1 | 1 | 0 | 1 | 0 | 0 | 1 |
| 26 | 1 | 1 | 1 | 0 | 1 | 0 | 0 | 1 |
| 27 | 1 | 1 | 1 | 0 | 0 | 0 | 0 | 1 |
| 28 | 1 | 1 | 1 | 0 | 0 | 0 | 0 | 1 |
| 29 | 1 | 1 | 1 | 0 | 0 | 0 | 0 | 1 |
| 2A | 1 | 1 | 1 | 0 | 0 | 0 | 0 | 1 |
| 2B | 1 | 1 | 1 | 1 | 0 | 0 | 0 | 1 |
| 2C | 1 | 1 | 1 | 0 | 0 | 0 | 0 | 1 |
| 2D | 1 | 1 | 1 | 1 | 0 | 0 | 0 | 1 |
| 2E | 0 | 0 | 0 | 0 | 1 | 1 | 0 | 1 |
| 2F | 1 | 0 | 0 | 0 | 1 | 1 | 0 | 1 |
| 30 | 1 | 0 | 0 | 0 | 0 | 0 | 0 | 1 |
| 31 | 1 | 0 | 0 | 0 | 0 | 0 | 0 | 1 |
| 32 | 1 | 0 | 0 | 0 | 0 | 0 | 0 | 1 |
| 33 | 1 | 0 | 0 | 0 | 0 | 0 | 0 | 1 |
| 34 | 1 | 0 | 0 | 1 | 0 | 0 | 0 | 1 |
| 35 | 1 | 0 | 0 | 0 | 0 | 0 | 0 | 1 |
| 36 | 1 | 0 | 0 | 1 | 0 | 0 | 0 | 1 |
| 37 | 0 | 0 | 1 | 0 | 0 | 0 | 0 | 1 |
| 38 | 1 | 0 | 1 | 0 | 0 | 0 | 0 | 1 |
| 39 | 1 | 0 | 1 | 0 | 0 | 0 | 0 | 1 |
| 3A | 1 | 0 | 1 | 0 | 0 | 0 | 0 | 1 |
| 3B | 1 | 0 | 1 | 0 | 0 | 0 | 0 | 1 |
| 3C | 1 | 0 | 1 | 0 | 0 | 0 | 0 | 1 |
| 3D | 1 | 0 | 1 | 1 | 0 | 0 | 0 | 1 |
| 3E | 1 | 0 | 1 | 0 | 0 | 0 | 0 | 1 |
| 3F | 1 | 0 | 1 | 1 | 0 | 0 | 0 | 1 |
| 40 | 0 | 1 | 0 | 0 | 0 | 0 | 0 | 1 |
| 41 | 1 | 1 | 0 | 0 | 0 | 0 | 0 | 1 |
| 42 | 1 | 1 | 0 | 0 | 0 | 0 | 0 | 1 |
| 43 | 1 | 1 | 0 | 0 | 0 | 0 | 0 | 0 |
| 44 | 1 | 1 | 0 | 0 | 0 | 0 | 0 | 0 |
| 45 | 1 | 1 | 0 | 0 | 0 | 0 | 1 | 0 |
| 46 | 1 | 1 | 0 | 1 | 0 | 0 | 0 | 1 |
| 47 | 1 | 1 | 0 | 0 | 0 | 0 | 0 | 1 |
| 48 | 1 | 1 | 0 | 1 | 0 | 0 | 0 | 1 |

What is claimed is:

1. A miss distance indicator for measuring and indicating a missile-to-target distance and a missile direction, said miss distance indicator comprising:

a scalar scoring system for generating a pulsed radio frequency signal having a predetermined frequency;

a phase lock loop circuit connected to said scalar scoring system to receive said pulsed radio frequency signal, said phase lock loop circuit, responsive to said pulsed radio frequency signal, generating a system clock signal;

a programmed array logic device connected to said phase lock loop circuit to receive said system clock signal, said programmed array logic device, responsive to said system clock signal, generating a plurality of antenna control signals, and a plurality of sample-hold pulse signals;

antenna means, responsive to said pulsed radio frequency signal and said antenna control signals, sequentially emitting first, second, third and fourth pulsed beams of radio frequency energy, each of said first, second, third and fourth pulsed beams of radio frequency energy having an identical pulse repetition frequency, said first, second, third and fourth pulsed beams of radio frequency energy forming a spherical radiation pattern of pulsed radio frequency energy to detect an incoming missile;

said antenna means receiving reflections of said first, second, third and fourth pulsed beams of radio frequency energy from said incoming missile and converting the reflections of said first, second, third and fourth pulsed beams of radio frequency energy into electrical signals corresponding to a scalar miss distance and a vector miss direction of said incoming missile from said antenna means, said antenna means being representative of a target;

said scalar scoring system receiving said electrical signals and then providing an analog video signal;

sampling means for receiving said analog video signal and said sample-hold pulse signals, said sampling means, responsive to said sample-hold pulse signals, sampling portions of said analog video signal;

bandpass filtering means for receiving the sampled portions of said analog video signal and then passing through said bandpass filtering means only the sampled portions of said analog video signal within a predetermined frequency range;

an analog-to-digital converter connected to said filtering means for converting the sampled portions of said analog video signal within said predetermined frequency range into an equivalent digital signal;

a pulse code modulation encoder connected to said analog-to-digital converter for encoding said equivalent digital signal into a serial bit stream and providing a frame sync logic signal for said serial bit stream; and a transmitter connected to said pulse code modulation encoder for transmitting said serial bit stream to a receiving station for processing by said receiving station.

2. The miss distance indicator of claim 1 wherein said antenna means comprises:

first, second, third and fourth spaced apart antennas configured to form a square, said first, second, third and fourth antennas respectively emitting said first, second, third and fourth pulsed beams of radio frequency energy, said first, second, third and fourth antennas respectively receiving the reflections of said first, second, third and fourth pulsed beams of radio frequency energy; and a radio frequency switch connected to said first, second, third and fourth antennas, said programmed array logic device and said scalar scoring system, said radio frequency switch, responsive to said antenna control signals, turning on only one of said first, second, third and fourth antennas for operation at a time before another of said first, second, third and fourth antennas is turned on by said radio frequency switch.

3. The miss distance indicator of claim 1 wherein the predetermined frequency of said pulsed radio frequency signal is about 504 kilohertz.

4. The miss distance indicator of claim 1 wherein said system clock signal has a frequency of about eight megahertz.

5. The miss distance indicator of claim 1 wherein the identical pulse repetition frequency of said first, second, third and fourth pulsed beams of radio frequency energy is about 128 kilohertz.

6. The miss distance indicator of claim 1 wherein the predetermined frequency range of the sampled portions of said analog video signal passing through said bandpass filtering means is from about seven hundred hertz to about eighteen kilohertz.

7. The miss distance indicator of claim 1 further comprising a programmed read only-memory coupled to said programmed array logic device, said programmed array logic device providing addressing signals to programmed read only memory, said programmed read only memory, responsive to said addressing signals, generating a plurality of digital control signals, said digital control signals being provided to said programmed array logic device by said programmed read only memory to control operation of said programmed array logic device.

8. The miss distance indicator of claim 1 wherein said pulse code modulation encoder includes a randomizer, said randomizer comprising:

a first EXCLUSIVE-OR gate having a first input for receiving said serial bit stream, a second input and an output;

a shift register having a data input connected to the output of said first EXCLUSIVE-OR gate and fifteen data bit outputs, a first data output of said fifteen data outputs being connected to said transmitter; and a second EXCLUSIVE-OR gate having a first input connected to a fourteenth data output of the fifteen data outputs of said shift register, a second input connected to the fifteenth data output of said shift register and an output connected to the second input of said first EXCLUSIVE-OR gate.

9. A miss distance indicator for measuring and indicating a missile-to-target distance and a missile direction, said miss distance indicator comprising:

a scalar scoring system for generating a pulsed radio frequency signal having a predetermined frequency;

a phase lock loop circuit connected to said scalar scoring system to receive said pulsed radio frequency signal, said phase lock loop circuit, responsive to said pulsed radio frequency signal, generating a system clock signal;

a programmed array logic device connected to said phase lock loop circuit to receive said system clock signal, said programmed array logic device, responsive to said system clock signal, generating a plurality of antenna control signals, and a plurality of sample-hold pulse signals;

antenna means, responsive to said pulsed radio frequency signal and said antenna control signals, sequentially emitting first, second, third and fourth pulsed beams of radio frequency energy, each of said first, second, third and fourth pulsed beams of radio frequency energy having an identical pulse repetition frequency, said first, second, third and fourth pulsed beams of radio frequency energy forming a spherical radiation pattern of pulsed radio frequency energy to detect an incoming missile;

said antenna means receiving reflections of said first, second, third and fourth pulsed beams of radio frequency energy from said incoming missile and converting the reflections of said first, second, third and fourth pulsed beams of radio frequency energy into electrical signals corresponding to a scalar miss distance and a vector miss direction of said incoming missile from said antenna means, said antenna means being representative of a target;

said antenna means comprising first, second, third and fourth spaced apart antennas and a radio frequency switch connected to said first, second, third and fourth antennas, said programmed array logic device and said scalar scoring system, said radio frequency switch turning on only one of said first, second, third and fourth antennas for operation at a time before another of said first, second, third and fourth antennas is turned on by said radio frequency switch;

said scalar scoring system receiving said electrical signals and then providing an analog video signal;

sampling means for receiving said analog video signal and said sample-hold pulse signals, said sampling means, responsive to said sample-hold pulse signals, sampling portions of said analog video signal;

bandpass filtering means for receiving the sampled portions of said analog video signal and then passing through said bandpass filtering means only the sampled portions of said analog video signal within a predetermined frequency range;

an analog-to-digital converter connected to said filtering means for converting the sampled portions of said analog video signal within said predetermined frequency range into an equivalent digital signal;

a pulse code modulation encoder connected to said analog-to-digital converter for encoding said equivalent digital signal into a serial bit stream and providing a frame sync logic signal for said serial bit stream;

said pulse code modulation encoder including a randomizer;

said randomizer randomizing data bits within said serial bit stream in a random sequence eliminating strings of ones and zeros from serial bit stream; and a transmitter connected to said pulse code modulation encoder for transmitting said serial bit stream to a receiving station for processing by said receiving station.

10. The miss distance indicator of claim 9 wherein the predetermined frequency of said pulsed radio frequency signal is about 504 kilohertz.

11. The miss distance indicator of claim 9 wherein said system clock signal has a frequency of about eight megahertz.

12. The miss distance indicator of claim 9 wherein the identical pulse repetition frequency of said first, second, third and fourth pulsed beams of radio frequency energy is about 128 kilohertz.

13. The miss distance indicator of claim 9 wherein the predetermined frequency range of the sampled portions of said analog video signal passing through said bandpass filtering means is from about seven hundred hertz to about eighteen kilohertz.

14. The miss distance indicator of claim 9 further comprising a programmed read only memory coupled to said programmed array logic device, said programmed array logic device providing addressing signals to programmed read only memory, said programmed read only memory, responsive to said addressing signals, generating a plurality of digital control signals, said digital control signals being provided to said programmed array logic device by said programmed read only memory to control operation of said programmed array logic device.

15. The miss distance indicator of claim 9 wherein said randomizer comprises:

a first EXCLUSIVE-OR gate having a first input for receiving said serial bit stream, a second input and an output;

a shift register having a data input connected to the output of said first EXCLUSIVE-OR gate and fifteen data bit outputs, a first data output of said fifteen data outputs being connected to said transmitter; and a second EXCLUSIVE-OR gate having a first input connected to a fourteenth data output of the fifteen data outputs of said shift register, a second input connected to the fifteenth data output of said shift register and an output connected to the second input of said first EXCLUSIVE-OR gate.

16. A miss distance indicator for measuring and indicating a missile-to-target distance and a missile direction, said miss distance indicator comprising:

a scalar scoring system for generating a pulsed radio frequency signal having a predetermined frequency;

a phase lock loop circuit connected to said scalar scoring system to receive said pulsed radio frequency signal, said phase lock loop circuit, responsive to said pulsed radio frequency signal, generating a system clock signal;

first, second, third and fourth spaced apart antennas, said first, second, third and fourth antennas respectively emitting first, second, third and fourth pulsed beams of radio frequency energy, each of said first, second, third and fourth pulsed beams of radio frequency energy having an identical pulse repetition frequency, said first, second, third and fourth pulsed beams of radio frequency energy forming a spherical radiation pattern of pulsed radio frequency energy to detect an incoming missile and then converting the reflections of said first, second, third and fourth pulsed beams of radio frequency energy into electrical signals corresponding to a scalar miss distance and a vector miss direction of said incoming missile from said antenna means, said first, second, third and fourth antennas being representative of a target;

said first, second, third and fourth antennas respectively receiving reflections of said first, second, third and fourth pulsed beams of radio frequency energy from said incoming missile;

a programmed array logic device connected to said phase lock loop circuit to receive said system clock signal, said programmed array logic device, responsive to said system clock signal, generating a plurality of antenna control signals, and a plurality of sample-hold pulse signals;

a radio frequency switch connected to said first, second, third and fourth antennas, said programmed array logic device and said scalar scoring system, said radio frequency switch, responsive to said antenna control signals, turning on only one of said first, second, third and fourth antennas for operation at a time before another of said first, second, third and fourth antennas is turned on by said radio frequency switch;

said scalar scoring system receiving said electrical signals and then providing an analog video signal;

a programmed read only memory coupled to said programmed array logic device, said programmed array logic device providing addressing signals to programmed read only memory, said programmed read only memory, responsive to said addressing signals, generating an analog-to-digital clock signal and a plurality of digital control signals, said digital control signals being provided to said programmed array logic device by said programmed read only memory to control operation of said programmed array logic device;

sampling means for receiving said analog video signal and said sample-hold pulse signals, said sampling means, responsive to said sample-hold pulse signals, sampling portions of said analog video signal;

bandpass filtering means for receiving the sampled portions of said analog video signal and then passing through said bandpass filtering means only the sampled portions of said analog video signal within a predetermined frequency range;

a multiplexer connected to said filtering means, said multiplexer selectively passing therethrough the sampled portions of said analog video signal within said predetermined frequency range;

an analog-to-digital converter connected to said multiplexer and said programmed read only memory, said analog-to-digital converter, responsive to said analog-to-digital clock signal, converting the sampled portions of said analog video signal passing through said bandpass filtering means into an equivalent digital signal;

a pulse code modulation encoder connected to said analog-to-digital converter for encoding said equivalent digital signal into a serial bit stream and providing a frame sync logic signal for said serial bit stream;

said pulse code modulation encoder including a randomizer;

said randomizer randomizing data bits within said serial bit stream in a random sequence eliminating strings of ones and zeros from serial bit stream; and a transmitter connected to said pulse code modulation encoder for transmitting said serial bit stream to a receiving station for processing by said receiving station.

17. The miss distance indicator of claim 16 wherein said randomizer comprises:

a first EXCLUSIVE-OR gate having a first input for receiving said serial bit stream, a second input and an output;

a shift register having a data input connected to the output of said first EXCLUSIVE-OR gate and fifteen data bit outputs, a first data output of said fifteen data outputs being connected to said transmitter; and a second EXCLUSIVE-OR gate having a first input connected to a fourteenth data output of the fifteen data outputs of said shift register, a second input connected to the fifteenth data output of said shift register and an output connected to the second input of said first EXCLUSIVE-OR gate.

18. The miss distance indicator of claim 16 wherein said pulse code modulation encoder includes a digital circuit for generating said frame sync logic signal, said digital circuit consisting of a pair of 2-line to 1-line multiplexers coupled to said analog-to-digital converter and a parallel to serial shift register coupled to said pair of 2-line to 1-line multiplexers.

19. The miss distance indicator of claim 16 wherein the identical pulse repetition frequency of said first, second, third and fourth pulsed beams of radio frequency energy is about 128 kilohertz.

20. The miss distance indicator of claim 16 wherein the predetermined frequency range of the sampled portions of said analog video signal passing through said bandpass filtering means is from about seven hundred hertz to about eighteen kilohertz.

* * * * *